United States Patent Office 2,958,677
Patented Nov. 1, 1960

2,958,677

PURIFICATION OF POLYMERS OF THE POLYAMIDE TYPE

Roger F. Kleinschmidt, Bartlesville, Okla., assignor to Phillips Petroleum Company, a corporation of Delaware No Drawing. Filed May 10, 1955, Ser. No. 507,481

18 Claims. (Cl. 260—78)

This invention relates to the purification of polymers of the polyamide type employing certain solvents as defined herein. In one of its aspects the invention relates to the purification of polymers of the polyamide type employing a cyclic amide. In another aspect the invention relates to the purification of a polymer of the polyamide type employing a lactone. In a further aspect of the invention it relates to the preparation of solutions of the polyamide type which are useful in the manufacture of shaped articles such as yarns, films and molded objects. Further, another aspect of the invention is that the solutions of the polymers of the polyamide type, here discussed, are useful as coating compositions which can be applied as now done in the art. Other aspects of the invention are apparent from the disclosure and the appended claims.

The products which are obtained when polymers of the polyamide type are prepared are frequently discolored by various impurities and/or by variable amounts of unreacted monomers. The heterogeneous nature of the polymers, both with respect to color and the presence of colorless impurities, including unreacted monomers, renders them unsuitable for many uses. Difficulties in the purification of these polymers have been encountered because they are resistant to the action of most solvents. They are soluble in hot phenol but working with this solvent is hazardous. The polymers dissolve with difficulty in hot N,N-dimethylformamide but only at its boiling point will appreciable amounts dissolve and precipitation occurs upon slight cooling of the mixture making it very difficult to filter the hot solution without the filter becoming plugged quickly with precipitated polymer.

I have now found that cyclic amides and lactones of the types hereinafter mentioned are superior solvents for polyamide type polymers, e.g., polycaprolactam; copolymers of caprolactam with materials such as N-vinylcaprolactam, copolymers of caprolactam with poly-N-vinylcaprolactam, N-vinyl-2-pyrrolidone, 2- pyrrolidone, 2-piperidone, N-vinyl-2-piperidone, etc.; poly-N-vinylcaprolactam; and copolymers of N-vinylcaprolactam with N-vinyl-2-pyrrolidone, 2-pyrrolidone, 2-piperidone and N-vinyl-2-piperidone as well as copolymers of N-vinylcaprolactam with various other copolymerizable vinyl, allyl and acrylic monomers.

More particularly, the polyamide type polymers which are preferably purified by the present invention are those which are characterized by the presence of a multiplicity of units of the formula

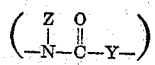

wherein Z is selected from the group consisting of hydrogen and vinyl and Y is a saturated divalent hydrocarbon radical.

Generally, the solvents which can be employed for the purification of the polyamide type polymers, here discussed, can be represented by the general formula

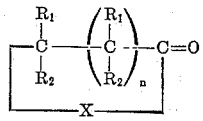

where $n$ is an integer in the range 2–4; X is one of O and NR where R is one of hydrogen, an alkyl, cycloalkyl, hydroxyalkyl, and alkenyl radical containing not over 6 carbon atoms, an aryl, alkaryl and aralkyl radical containing not over 8 carbon atoms; $R_1$ and $R_2$ can be one of hydrogen, hydroxy, alkyl, cycloalkyl, hydroxyalkyl, and alkoxy radicals containing not over 6 carbon atoms each, an aryl, aralkyl, and alkaryl radical containing not over 8 carbon atoms each; when any of the groups R, $R_1$ and $R_2$ is an aryl radical, it can be substituted with an inert group which is one of halogen, alkoxy, etc., in addition to alkyl groups with the limitation of 8 carbon atoms in a given radical being maintained and in which solvents the total carbon atoms in R, $R_1$ and $R_2$ is not greater than 10. $R_1$ and $R_2$ are preferably one of hydrogen, methyl, ethyl, methoxy, ethoxy, hydroxy and phenyl radicals but it is generally preferred that not more than one hydroxy group be present.

Examples of solvents which are applicable are 2-pyrrolidone, N-methyl-2-pyrrolidone, N-ethyl-2-pyrrolidone, 3 - hydroxy-2-pyrrolidone, 4-hydroxy-2-pyrrolidone, 3-methyl-2-pyrrolidone, 5-methyl-2-pyrrolidone, 4-methoxy-2-pyrrolidone, 4-methylol-2-pyrrolidone, 5-phenyl-2 - pyrrolidone, 3 - cyclohexyl - 2-pyrrolidone, N-(2-hydroxyethyl)-2-pyrrolidone, N-cyclohexyl-2-pyrrolidone, N-phenyl-2-pyrrolidone, N-vinyl-2-pyrrolidone, N-phenyl - 5 - methyl - 2-pyrrolidone, N-methyl-5-methyl-2-pyrrolidone, 6-methyl-2-piperidone, 6-ethyl-2-piperidone, 4,6 - dimethyl-2-piperidone, 6-methoxy-2-piperidone, 6-methylol - 2 - piperidone, N - (2-hydroxyethyl)-2-piperidone, N-cyclohexyl-2-piperidone, N-phenyl-2-piperidone, N-methyl-caprolactam, N-ethyl-caprolactam, caprolactam, N - vinylcaprolactam, butyrolactone, 5 - methylbutyrolactone, valerolactone, 6 - methylvalerolactone, 3-phenyl - butyrolactone, 4 - cyclohexylbutyrolactone, 4-methoxy-caprolactone, 3,4-diethyl-2-pyrrolidone, 1,3-dimethyl-2-pyrrolidone, 4-ethyl-2-pyrrolidone, 3-ethyl-4-phenyl-2-pyrrolidone, 5-(hydroxymethyl)-2-pyrrolidone, 4-phenyl-2-pyrrolidone, N-amyl-2-pyrrolidone, 3-ethyl-2 - pyrrolidone, 3 - phenyl - 1 - cyclohexyl-3-(2-hydroxyethyl)-2-pyrrolidone, 4,5-diethyl-2-piperidone, 4-methoxymethyl - 2 - piperidone, and 6-methyl-2-piperidone. Thus, according to the invention, the solvents which are applicable are cyclic amides (lactams) and lactones. These compounds are liquids at a temperature below 100° C. Mixtures of these compounds or the solvents within the scope of this invention can also be employed according to this invention. Generally, the solvents which are applicable are those which remain liquid under the operating conditions, i.e., those which are in the liquid state when the polymer dissolves and which remain in this state during precipitation and separation of the polymer. It should be understood that precipitation and separation of the polymer can be effected at elevated temperatures but the temperatures are somewhat lower than are required for solution of the polymer. Generally, it is preferred that the solvents are materials which are liquids at temperatures below 100° C.

Therefore, according to this invention, polymers of the polyamide type are purified employing at least one solvent as above-defined.

In one embodiment of the invention the polymers are readily purified by heating a mixture of the polymer to be purified and a solvent, according to the invention, to a temperature at which substantially all of the polymer has dissolved. Upon cooling, a somewhat purified polymer can be obtained. However, it is now preferred to filter the solution while hot whenever it contains undissolved particles. Thus, in the embodiment now described, the hot solution is filtered through a sintered glass funnel whereupon it is cooled. Upon cooling, the solid polymer separates from the solution and is recovered by filtration as a finely divided, flocculent product. Impurities, including colored materials, are found to remain in the solvent.

Usually a temperature in the range of about 140 to about 175° C., or higher, is employed to dissolve the polymer in the selected solvent. Mixtures of solvents can be employed.

Prior to separation of precipitated polymer from the solvent, it is advantageous to add to the mixture a diluent which is miscible with the solvent but does not dissolve the polymer, such as water, methanol, ethanol, propanol, acetone, or the like. This procedure facilitates removal of the higher boiling solvent from the solid product when it is filtered or otherwise separated from the solvent and also promotes additional precipitation of the polymer from the solution. Subsequent to filtration the solid polymeric product can be washed with this lower boiling diluent.

An alternative method is to separate the precipitated polymer from the solvent, thereby removing the major portion of the polymer, and then add a diluent such as described above. This procedure will promote precipitation of any polymer which has been retained by the solvent. After filtration, the solid product is washed with the low boiling diluent.

The cyclic amide and lactone solvents employed in this invention have many advantages over a solvent such as N,N-dimethylformamide for the purification of polyamide type polymers. These solvents will dissolve the polymers much more readily at a lower temperature than the N,N-dimethylformamide and more polymer will dissolve per part of solvent. In the purification process, solutions containing from 5 to 10 and higher weight percent polymer in the solvent, generally, can be prepared. Furthermore, as hereinbefore mentioned, solutions of these polymers in cyclic amide and lactone solvents can be readily filtered while hot without the filter becoming plugged with precipitated polymer.

After purification of polyamide type polymers in accordance with the method of this invention, these polymers can be dissolved in the cyclic amide or lactone solvents of the invention and the resulting solutions employed in the manufacture of fibers, films and molded objects employing known techniques. The solutions can also be used as coating compositions, as stated.

*Example I*

One hundred thirteen grams of caprolactam, 72 grams of water, and 1 gram of glacial acetic acid were charged to an autoclave which was then purged with nitrogen. The autoclave was closed and the mixture was heated at 245–250° C. for three hours, after which the pressure was released slowly (over a 30-minute period) and some vapors were evolved. Heating was continued for one hour at 250–260° C. with the autoclave open to the atmosphere. The product, when cooled, was a hard polymer, heterogeneous in appearance, and consisted essentially of a pearl white to tan material with smaller amounts of a dark brown material intermingled therewith. Other impurities which are colorless are possibly also present, e.g., unreacted caprolactam.

N-methyl-2-pyrrolidone was added to a sample of the crude and discolored polycaprolactam and the mixture was heated to 160° C. A clear solution was obtained. The polycaprolactam was employed in a quantity such that a 5–10 weight percent solution in N-methyl-2-pyrrolidone was formed. The solution was filtered hot through a sintered glass funnel and no premature precipitation of the polymer occurred in the filter funnel. Polycaprolactam separated as the solution cooled to give a fine, white, flocculent solid. It had a melting point of 219–220° F.

A similar attempt was made to purify the crude polycaprolactam using N,N-dimethylformamide instead of N-methyl-2-pyrrolidone. The polymer dissolved only slowly in the boiling solvent and then only to a relatively small degree. Attempted fitration of the hot, supernatant solution caused rapid precipitation of the polymer in the filtering equipment, thus blocking any further filtration and rendering removal of insoluble impurities from the hot N,N-dimethylformamide solution virtually impossible.

*Example II*

A mixture of 113 grams of caprolactam (1.0 mol) and 28 grams of N-vinylcaprolactam (0.2 mole) was charged to an autoclave together with one gram of glacial acetic acid and 80 grams of water. The reaction vessel was purged with nitrogen, closed, the mixture was heated at 250° C. for three hours, and the pressure was then released slowly. Heating was continued for one hour at 240–260° C. with the autoclave open to the atmosphere. The copolymer was a very hard, yellow to tan solid, with a dark brown surface.

Ten grams of the crude caprolactam/N-vinylcaprolactam copolymer and 150 grams of N-methyl-2-pyrrolidone were heated to 160° C., the mixture was filtered while hot, and then allowed to cool. The polymer precipitated from solution to give a white to light tan product. Eight grams of the polymer was obtained in the form of a dry powder. It had a melting point of 214–217° C.

*Example III*

A mixture of 79 grams of caprolactam (0.7 mol) and 42 grams of N-vinylcaprolactam (0.3 mol) was charged to an autoclave together with one gram of glacial acetic acid and 72 grams of water. The polymerization procedure described in Example II was followed. The copolymer was a hard, tan to light brown solid.

Ten grams of the crude copolymer, prepared as described above, and 100 grams of N-methyl-2-pyrrolidone were heated to 160° C., the mixture was filtered while hot, and then allowed to cool. Eight grams of a white to light tan product was obtained in the form of a dry powder. It had a melting point of 205–207° C.

*Example IV*

Caprolactam (11.3 grams, 0.1 mol) and 13.9 grams (0.1 mol) of a homopolymer of N-vinylcaprolactam (prepared by polymerization of N-vinylcaprolactam in n-propanol in the presence of $H_2O_2$ as a catalyst) were charged to an autoclave together with 1.0 ml. of concentrated HCl and 50 ml. of water. The autoclave was purged with nitrogen, closed and the reaction mixture heated at 250° C. for two hours. The pressure was released slowly after which heating was continued for one hour at 250–260° C. with the autoclave open to the atmosphere. A hard, brittle, brown resin, melting at 180–183° C. was obtained.

To the crude polymeric product prepared as described above, 150 cc. of N-methyl-2-pyrrolidone was added, the mixture was heated to effect solution, decolorizing charcoal was added, and the mixture was filtered while hot. Upon cooling a heavy paste of the product developed. After dilution with two volumes of acetone, the solid polymer was separated by filtration. The polymeric material was obtained as an ivory-colored dry powder.

*Example V*

Three polyamide polymers, each prepared by the method described in Example I, were as follows: homopolymer of N-vinylcaprolactam, 83/17 caprolactam/N-vinylcaprolactam copolymer, and 70/30 caprolactam/N-vinylcaprolactam copolymer. Tests were made by heating the polymer in the solvent noted in the table until solution occurred and then allowing the solution to cool. In each case the solvent-polymer mixture contained approximately 10 percent by weight of polymer. Results obtained were as follows:

| Solvent | Homopolymer of Vinylcaprolactam | | Caprolactam/Vinylcaprolactam Copolymers | | | |
|---|---|---|---|---|---|---|
| | | | 83/17 | | 70/30 | |
| | Hot Solvent | Cold Solvent | Hot Solvent | Cold Solvent | Hot Solvent | Cold Solvent |
| N-Methyl-2-pyrrolidone | Dissolved | Precipitated | Dissolved | Precipitated | Dissolved | Precipitated. |
| Gamma-butyrolactone | do | do | do | do | do | Do. |
| N-Ethylcaprolactam | | | | | do | Do. |
| 2-Pyrrolidone | Dissolved | Precipitated | | | do | Do. |
| N-Vinylcaprolactam | | | Dissolved | Precipitated | | |
| N-Vinyl-2-pyrrolidone | Dissolved | Precipitated | | | | |

The products obtained were white to light tan in color. Colored impurities remained in the solvent.

A homopolymer of N-vinylcaprolactam was prepared using hydrogen peroxide as a catalyst. It was soluble in hot N-methyl-2-pyrrolidone, gamma-butyrolactone, 2-pyrrolidone, and N-vinylcaprolactam but the polymer did not precipitate when the solutions were cooled. This illustrates that polymers which are not of the polyamide type cannot ordinarily be purified according to the invention.

One skilled in the art in possession of this disclosure will understand that it is within the scope of the appended claims to employ solvents herein set forth for the purification of a polymer of the polyamide type in the preparation of shaped articles, coating compositions, etc., regardless of the source of the said polymer of the polyamide type. That is, the invention, as claimed, is not limited to uses of the said polymers as purified according to the invention.

Reasonable variation and modification are possible within the scope of the foregoing disclosure and the appended claims to the invention, the essence of which is that polymers of the polyamide type, as described, are purified employing a solvent as described, in a preferred embodiment together with a diluent, also as described; in one embodiment the solvent and polymer being heated at least until the polymer is substantially dissolved in the solvent, the solution filtered while hot and then cooled to obtain solid polymer which separates; and that employing the said solvents, solutions can be prepared suitable for use in the manufacture of shaped articles such as yarns, films and molded objects; the said solutions being also suited for use as coating compositions.

I claim:

1. A purification of a solid polyamide which is characterized by repeated intralinear units of the formula

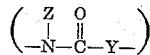

wherein Z is selected from the group consisting of hydrogen and vinyl radical and Y is a saturated divalent hydrocarbon radical which comprises forming a solution consisting essentially of a minor proportion of such a solid polyamide and a major proportion of a solvent characterized by the formula

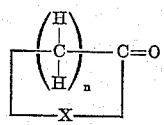

wherein $n$ is an integer in the range 3–5; X is selected from the group consisting of oxygen (O) and NR; and R is selected from the group consisting of hydrogen and alkyl containing not more than 6 carbon atoms and vinyl, said solvent being a liquid below about 100° C., the solution being formed by heating to dissolve the polyamide in said solvent, the solution, when formed and before cooling, later effected, being sufficiently dilute in the polymer that on cooling a precipitate of polymer forms in a separable state, the solution containing polymer approximately in the range 5–10 percent by weight in the solvent, then cooling the solution, as such, until polyamide precipitates out as a sub-divided crystalline mass and recovering said mass from the solution.

2. A purification according to claim 1 wherein the polyamide is selected from the group consisting of (1) polycaprolactam; (2) a copolymer of caprolactam with at least one material selected from the group consisting of N-vinylcaprolactam, N-vinyl-2-pyrrolidone, 2-pyrrolidone, 2-piperidone, N-vinyl-2-piperidone; (3) a copolymer of caprolactam with poly-N-vinylcaprolactam; (4) poly-N-vinylcaprolactam; and (5) a copolymer of N-vinylcaprolactam with at least one material selected from the group consisting of N-vinyl-2-pyrrolidone, 2-pyrrolidone, 2-piperidone and N-vinyl-2-piperidone.

3. A purification according to claim 1 wherein the solution obtained is filtered while hot.

4. A purification according to claim 1 wherein a diluent which is miscible with the solvent but which is not capable of dissolving the precipitated polyamide is added to the mixture of solvent and precipitated polyamide before the precipitate is separated from the mass.

5. A purification according to claim 1 wherein a solvent which is miscible with said solvent but which is not capable of dissolving the precipitated polyamide is employed to wash the polyamide after it has been recovered from the solution.

6. A purification according to claim 1 wherein the solution is filtered while hot, a diluent which is miscible with the solvent but in which the solid polyamide is substantially insoluble is added to the solvent and precipitated solid purified polyamide is recovered from the mass.

7. A purification of a solid polyamide according to claim 1 wherein the solvent is N-methyl-2-pyrrolidone.

8. A purification of a solid polyamide according to claim 1 wherein the solvent is gamma-butyrolactone.

9. A purification of a solid polyamide according to claim 1 wherein the solvent is N-ethylcaprolactam.

10. A purification of a solid polyamide according to claim 1 wherein the solvent is 2-pyrrolidone.

11. A purification of a solid polyamide according to claim 1 wherein the solvent is N-vinylcaprolactam.

12. A purification of a solid polyamide according to claim 1 wherein the solvent is N-vinyl-2-pyrrolidone.

13. A purification of a solid copolymer, of caprolactam with poly-N-vinylcaprolactam, prepared in the presence of a peroxide catalyst which is characterized by repeated intralinear units of the formula

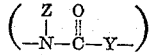

wherein Z is selected from the group consisting of hydrogen and vinyl radical and Y is a saturated divalent hydrocarbon radical which comprises forming a solution consisting essentially of a minor proportion of such a solid polyamide and a major proportion of a solvent characterized by the formula

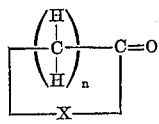

wherein $n$ is an integer in the range 3–5; X is selected from the group consisting of oxygen (O) and NR; and R is selected from the group consisting of hydrogen, alkyl containing not more than 6 carbon atoms and vinyl, said solvent being a liquid below about 100° C., the solution being formed by heating to dissolve the polyamide in said solvent, the solution, when formed and before cooling, later effected, being sufficiently dilute in the polymer that on cooling a precipitate of polymer forms in a separable state, the solution containing polymer approximately in the range 5–10 percent by weight in the solvent, then cooling the solution, as such, until polyamide precipitates out as a sub-divided crystalline mass, adding a diluent which is miscible with the solvent but in which the copolymer is substantially insoluble, and recovering said mass from the solution.

14. A purification of a solid copolymer, of caprolactam with poly-N-vinylcaprolactam, prepared in the presence of a peroxide catalyst which is characterized by repeated intralinear units of the formula

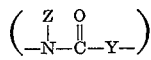

wherein Z is selected from the group consisting of hydrogen and vinyl radical and Y is a saturated divalent hydrocarbon radical which comprises forming a solution consisting essentially of a minor proportion of such a solid polyamide and a major proportion of a solvent characterized by the formula

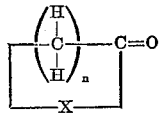

wherein $n$ is an integer in the range 3–5; X is selected from the group consisting of oxygen (O) and NR; and R is selected from the group consisting of hydrogen, alkyl containing not more than 6 carbon atoms and vinyl, said solvent being a liquid below about 100° C., the solution being formed by heating to dissolve the polyamide in said solvent, the solution, when formed and before cooling, later effected, being sufficiently dilute in the polymer that on cooling a precipitate of polymer forms in a separable state, the solution containing polymer approximately in the range 5–10 percent by weight in the solvent, then cooling the solution, as such, until polyamide precipitates out as a sub-divided crystalline mass and recovering said mass from the solution.

15. The purification of solid polycaprolactam polyamide which comprises admixing the same with N-methyl-2-pyrrolidone, heating the mixture thus obtained to obtain a solution, filtering the solution thus obtained, then cooling the filtered solution and recovering purified solid sub-divided polycaprolactam, said solid polycaprolactam polyamide being admixed in approximately 5–10 percent by weight with said N-methyl-2-pyrrolidone.

16. A purification of a solid caprolactam-N-vinylcaprolactam copolymer which comprises admixing the same with N-methyl-2-pyrrolidone, heating the admixture thus obtained to obtain a solution, filtering while hot, then allowing the hot solution to cool and recovering purified sub-divided copolymer as a precipitate, said solid caprolactam-N-vinylcaprolactam copolymer being admixed in approximately 5–10 percent by weight with said N-methyl-2-pyrrolidone.

17. The purification of a solid copolymer of caprolactam with a homopolymer of N-vinylcaprolactam which comprises admixing the same with N-methyl-2-pyrrolidone, heating to effect solution, adding a decolorizing agent, filtering while hot, cooling, diluting the solution with a diluent in which the solid sub-divided copolymer which is thus obtained is not soluble and filtering said solid copolymer of caprolactam with a homopolymer of N-vinylcaprolactam being admixed in approximately 5–10 percent by weight with said N-methyl-2-pyrrolidone.

18. The purification and decolorization of a solid polycaprolactam which comprise adding a minor proportion of a crude polycaprolactam to a major proportion of N-methyl-2-pyrrolidone by weight, heating the mixture until a clear solution is obtained, filtering the solution and cooling the filtered solution until a precipitate is obtained and separating the precipitate from the solution, thus, obtaining preferred and decolorized polycaprolactam in sub-divided crystalline form, the said minor proportion of polycaprolactam being approximately in the range 5–10 percent by weight in the N-methyl-2-pyrrolidone.

References Cited in the file of this patent

UNITED STATES PATENTS

| | | |
|---|---|---|
| 2,265,127 | Bolton | Dec. 9, 1941 |
| 2,293,760 | Peters | Aug. 25, 1942 |
| 2,404,719 | Houtz | July 23, 1946 |
| 2,473,920 | Taylor | June 21, 1949 |
| 2,592,616 | Stott | Apr. 15, 1952 |
| 2,638,463 | Ney et al. | May 12, 1953 |

FOREIGN PATENTS

| | | |
|---|---|---|
| 897,257 | France | May 22, 1944 |
| 989,062 | France | May 16, 1951 |
| 645,033 | Great Britain | Oct. 25, 1950 |
| 883,763 | France | Mar. 29, 1943 |
| 883,764 | France | Mar. 29, 1943 |

OTHER REFERENCES

Houwink, Elastomers and Plastomers, vol. 1, Elsevier (1950), pages 395–397.